United States Patent Office 3,394,028
Patented July 23, 1968

3,394,028
PROCESS FOR COATING POROUS OR
NON-POROUS SUBSTRATES
Hermann Nachbur, Riehen, and Arthur Maeder, Therwil, Switzerland, assignors to Ciba Limited, Basel, Switzerland, a Swiss company
No Drawing. Filed Feb. 1, 1965, Ser. No. 429,616
Claims priority, application Switzerland, Feb. 7, 1964, 1,505/64
4 Claims. (Cl. 117—138.8)

ABSTRACT OF THE DISCLOSURE

A process for coating porous or non-porous substrates is provided wherein a solution in an organic solvent of (1) a copolymer compound of (a) 15 to 50% by weight of a vinyl ester of an aliphatic saturated monocarboxylic acid, (b) 40 to 80% by weight of an alkyl ester of an aliphatic $\alpha,\beta$-ethylenically unsaturated carboxylic acid, and (c) 2 to 10% by weight of an aliphatic $\alpha,\beta$-ethylenically unsaturated carboxylic acid, and (2) an aminoplast soluble in organic solvents, preferably ethers of methylolated 1,3,5-aminotriazines or urea, the said aminoplasts being preferably added in an amount of 5 to 30% by weight referred to the copolymer (1), is applied to the substrate, dried and cured at a temperature within the range from 100 to 108° C.

---

The present invention provides a process for coating porous or non-porous substrates, wherein a solution in an organic solvent of a mixture of (1) A copolymer compound of (a) 15 to 50% by weight of a vinyl ester of an aliphatic saturated monocarboxylic acid,
(b) 40 to 80% by weight of an alkyl ester of an aliphatic $\alpha,\beta$-ethylenically unsaturated carboxylic acid, and
(c) 2 to 10% by weight of an aliphatic $\alpha,\beta$-ethylenically unsaturated carboxylic acid, and (2) An aminoplast soluble in organic solvents, preferably ethers of methylolated 1,5,5-aminotriazines or urea, the said aminoplasts being preferably added in an amount of 5 to 30% by weight referred to the copolymer (1), is applied to the substrate, dried and cured at a temperature within the range from 100 to 108° C.

The copolymer (1) consists advantageously of 25 to 35% by weight of the component (a), of 60 to 70% by weight of the component (b) and of 4 to 6% by weight of the component (c). As component (a) there are suitable vinyl esters of aliphatic, saturated monocarboxylic acids containing 1 to 5 carbon atoms. As relevant examples there may be mentioned vinyl formate, vinyl propionate and above all vinyl acetate. The alkyl esters of component (b) are derived from aliphatic $\alpha,\beta$-ethlenically unsaturated carboxylic acids containing 3 to 5 carbon atoms, such as methacrylic, itaconic, fumaric, crotonic and especially acrylic acid. The ester grouping is preferably derived from saturated aliphatic alcohols containing 1 to 12, preferably 4 to 8, carbon atoms. As examples of suitable alkyl esters there may be mentioned methyl methacrylate, ethyl acrylate, 2-ethylhexyl acrylate, dodecyl methacrylate and primarily n-butyl acrylate. The component (c) is an aliphatic, $\alpha,\beta$-ethylenically unsaturated carboxylic acid containing 3 to 5 carbon atoms, for example methacrylic, crotonic, itaconic, fumaric or especially acrylic acid.

As aminoplasts soluble in organic solvents there are preferably used ethers that are soluble in organic solvents, from aliphatic or alicyclic monoalcohols containing 1 to 6, preferably 3 to 4, carbon atoms and from methylolated urea or methylolated 1,3,5-aminotriazines containing 2 to 3 amino groups. Suitable 1,3,5-aminotriazines are benzoguanamine, acetoguanamine, formoguanamine and especially melamine. As a rule, the ethers are derived from methylol groups, one mol of the methylol compound being etherified with 2 to 6, preferably with 2 to 4, mols of the monoalcohol. Alcohols suitable for the etherification are methanol, ethanol, n-propanol, isopropanol, hexanol, cyclohexanol and especially n-butanol.

A particularly suitable aminoplast component (2) is the dibutyl, tributyl or tetrabutyl ether of hexamethylolmelamine.

The copolymers to be used in the present invention are manufactured in the usual manner by copolymerization in an organic solvent at a temperature ranging from 60 to 90° C. and in the presence of a catalyst capable of furnishing free radicals. Suitable organic solvents are toluene, xylene, acetone, dioxane and especially ethyl acetate or symmetrical dichloroethane.

Porous materials that can be coated according to this invention are textile fabrics, paper or leather. Particularly advantageous coatings are obtained on nylon fabrics. Suitable non-porous materials are metals, wood, glass and building materials. The coatings are distinguished by their particularly high resistance to solvents. In particular, they resist several repeated treatments with trichloroethylene.

The mixtures are prepared by mixing the two components (1) and (2) at room temperature. If desired, the mixtures may further contain fillers or pigments, plasticizers and/or other assistants.

The mixtures can be applied to the substrate in various ways, for example by dipping and subsequent expression to the desired content or with the aid of a coating machine, preferably with a doctor device. It is also possible to coat with a brush or a spraying device. After having been coated the substrate is dried at room temperature or with heating, advantageously at 40 to 80° C. The curing of the coatings may be performed at a temperature ranging from 80 to 180° C., preferably from 130 to 160° C. Alternatively, especially when coating building materials, leather, metals, glass or paper or in the manufacture of laminates from glass fibre mats, the mixture may be converted into the insoluble, cross-linked state at room temperature, that is to say at 18 to 25° C.

Percentages in the following examples are by weight. "SNV-3 washing" means washing the fabric at 60° C. with a liquor containing per liter 5 g. of soap and 2 g. of sodium carbonate.

Example 1

A solution of 77 g. of vinyl acetate, 56 g. of n-butyl acrylate and 7 g. of acrylic acid in 210 g. of ethyl acetate is heated to the reflux temperature (about 78° C.) in a 500 ml.-stirring flask equipped with reflux condenser and thermometer. 0.2 g. of benzoyl peroxide is then added and this addition is repeated 4 times at intervals of 1 hour each. 2 hours after the last addition the batch is cooled, to yield 438 g. of a medium viscous solution containing about 38% of polymer. The polymer yield amounts to 93 to 94% of the theoretical.

100 g. of the above polymer solution are mixed with 5 g. of an 80% n-butanolic solution of a hexamethylolmelamine ether containing 2 to 3 n-butyl ether groups, and with 10 ml. of ethyl acetate. A nylon fabric is coated with this mixture twice with in-between drying, then dried for 15 to 20 minutes at 80° C. and cured for 5 minutes at 150° C. The resultant coating weighs 18.35 g. per square meter.

The coated fabric has a dry handle somewhat resembling that of paper. After having been immersed 3 times for 30 minutes in trichloroethylene at room temperature, the coating has lost 13.5% in weight. The Heermann test (test for water-permeability of fabrics in the water pressure test; water head maximum 150 cm.) still reveals the maximum value of 150 cm. even after three SNV–3 washes and after washing in trichloroethylene.

Example 2

A solution of 63 g. of vinyl acetate, 70 g. of n-butyl acrylate and 7 g. of acrylic acid in 210 g. of ethyl acetate is polymerized as described in the first paragraph of Example 1, to yield 344 g. of a medium viscous solution which contains 37.6% of polymer.

The polymer yield amounts to 92% of the theoretical.

100 g. of the above polymer solution are mixed with 5 parts of an 80% n-butanolic solution of a hexamethylolmelamine ether containing 2 to 3 n-butyl ether groups, and with 10 ml. of ethyl acetate.

A nylon fabric is treated with the resulting mixture as described in Example 1. The coating weighs 19.07 g. per square meter.

The coated fabric has a soft, dry handle. After having been immersed 3 times for 30 minutes in trichloroethylene at room temperature the coating has lost 8% of its weight. The Heermann test reveals after three SNV–3 washes and after a trichloroethylene wash still the maximum value of 150 cm.

Example 3

A solution of 56 g. of vinyl acetate, 77 g. of n-butyl acrylate and 7 g. of acrylic acid in 210 g. of ethyl acetate is polymerized as described in the first paragraph of Example 1.

There are obtained 351 g. of a medium viscous solution which contains 37.3% of polymer. The polymer yield amounts to 92 to 93% of the theoretical.

100 g. of the above polymer solution are mixed with 5 g. of an 80% n-butanolic solution of a hexamethylolmelamine ether containing 2 to 3 n-butyl ether groups, and with 10 ml. of ethyl acetate. A nylon fabric is coated with this mixture as described in Example 1. The resultant coating weighs 18.4 g. per square meter.

The coated fabric has a dry, slightly paper-like handle. After having been immersed three times for 30 minutes in trichloroethylene at room temperature, the coating has lost 12.5% of its weight. The Heermann test reveals after three SNV–3 washes and after the trichloroethylene wash still the maximum value of 150 cm.

Example 4

A solution of 26.6 g. of vinyl acetate, 105 g. of n-butyl acrylate and 8.4 g. of acrylic acid in 210 g. of ethyl acetate is polymerized as described in the first paragraph of Example 1.

There are obtained 349 g. of a medium viscous solution which contains 37.8% of polymer. The polymer yield amounts to 93 to 94% of the theoretical.

100 g. of the above polymer solution are mixed with 5 g. of an 80% n-butanolic solution of a hexamethylolmelamine ether containing 2 to 3 n-butyl ether groups, and with 10 ml. of ethyl acetate. A nylon fabric is coated with this mixture as described in Example 1. The resultant coating weighs 15.9 g. per square meter.

The coated fabric has a soft, dry handle. After having been immersed 3 times for 30 minutes in trichloroethylene at room temperature the coating has lost 8.9% of its weight. The Heermann test reveals both after three SNV–3 washes and after the trichloroethylene wash still the maximum value of 150 cm.

Example 5

A solution of 42 g. of vinyl acetate, 91 g. of n-butyl acrylate and 7 g. of acrylic acid in 210 g. of ethyl acetate is polymerized as described in the first paragraph of Example 1.

There are obtained 340 g. of a medium viscous solution which contains 38.7% of polymer. The polymer yield amounts to 93 to 94% of the theoretical.

100 g. of the above polymer solution are mixed with 5 g. of an 80% n-butanolic solution of a hexamethylolmelamine ether containing 2 to 3 n-butyl ether groups, and with 10 ml. of ethyl acetate. A nylon fabric is coated with this mixture as described in Example 1. The resultant coating weighs 18.34 g. per square meter.

The coated fabric has a soft, dry handle. After having been immersed 3 times for 30 minutes in trichloroethylene at room temperature, the coating has lost 10.4% of its weight. The Heermann test reveals both after three SNV–3 washes and after the trichloroethylene wash still the maximum value of 150 cm.

Example 6

100 g. of the polymer solution described in Example 5 are mixed with 5 g. of a 75% n-butanolic solution of a dimethylolurea mono-n-butyl ether, and with 20 ml. of ethyl acetate. A nylon fabric is coated with this mixture as described in Example 1. The resultant coating weighs 13.2 g. per square meter.

The coated fabric has a soft, dry handle. After having been immersed 3 times for 30 minutes in trichloroethylene at room temperature the coating has lost 13.1% of its weight. The Heermann test reveals both after three SNV–3 washes and after the trichloroethylene wash still the maximum value of 150 cm.

Example 7

100 g. of the polymer solution described in Example 5 are mixed with 5 g. of a lacquer resin of a 65% butanolic solution of a methylolbenzoguanamine etherified with n-butanol, and with 20 ml. of ethyl acetate. A nylon fabric is coated with this mixture as described in Example 1. The resultant coating weighs 14.6 g. per square meter.

The coated fabric has a soft handle. After having been immersed 3 times for 30 minutes in trichloroethylene at room temperature the coating has lost 17.5% of its weight. The Heermann test reveals after three SNV–3 washes still the maximum value of 150 cm. and after the trichloroethylene wash still a water head value of 111 cm.

Example 8

100 g. of the polymer solution described in Example 5 are mixed with 5 g. of hexamethylolmelamine pentamethyl ether (dry content 97%, remainder water) and 20 ml. of ethyl acetate. A nylon fabric is coated with this mixture as described in Example 1. The resultant coating weighs 13.8 g. per square meter.

The coated fabric has a soft handle. After having been immersed 3 times for 30 minutes in trichloroethylene at room temperature the coating has lost 11.5% of its weight. The Heermann test reveals both after three SNV–3 washes and after the trichloroethylene wash still the maximum value of 150 cm.

Example 9

100 g. of the polymer solution described in Example 5 are mixed with 5 g. of hexamethylolmelamine tetramethyl ether (dry content 97%, remainder water) and 20 ml. of ethyl acetate. A nylon fabric is coated with this mixture as described in Example 1. The resultant coating weighs 14.2 g. per square meter.

The coated fabric has a soft handle. After having been immersed 3 times for 30 minutes in trichloroethylene at room temperature the coating has lost 13.2% of its weight. The Heermann test reveals both after three SNV–3 washes and after the trichloroethylene wash still the maximum value of 150 cm.

What is claimed is:

1. A process for coating substrates, wherein a solution in an organic solvent of a mixture consisting essentially of (1) a copolymer consisting of from
  (a) 15 to 50% by weight of a vinyl ester of an aliphatic saturated monocarboxylic acid containing 1 to 5 carbon atoms,
  (b) 40 to 80% by weight of an alkyl ester of acrylic acid containing 1 to 12 carbon atoms in the alkyl radical, and
  (c) 2 to 10% by weight of acrylic acid, and
(2) an aminoplast soluble in organic solvents, said aminoplast being a member selected from the group consisting of an ether of a methylolated urea and of an ether of a methylolated amino-1,3,5-triazine, the said aminoplast being used in an amount of 5 to 30% by weight referred to the weight of the copolymer (1), is applied to the substrate, and the coated substrate is dried and then cured at a temperature ranging from 100 to 180° C.

2. A process as claimed in claim 1, wherein the copolymer (1) is a copolymer from (a) vinyl acetate, (b) n-butyl acrylate and (c) acrylic acid.

3. A process as claimed in claim 1, wherein said aminoplast is a butyl ether of hexamethylolmelamine.

4. A process as claimed in claim 1, wherein the substrate which is coated, is a nylon fabric.

References Cited
UNITED STATES PATENTS

| | | | |
|---|---|---|---|
| 2,715,590 | 8/1955 | Brockman et al. | 117—138.8 |
| 2,763,578 | 9/1956 | Simons | 117—161 X |
| 2,976,167 | 3/1961 | Maeder et al. | 117—38 X |
| 3,183,282 | 5/1965 | Hurwitz | 260—851 X |

WILLIAM D. MARTIN, *Primary Examiner.*

J. E. MILLER, *Assistant Examiner.*

UNITED STATES PATENT OFFICE
CERTIFICATE OF CORRECTION

Patent No. 3,394,028                  July 23, 1968

Hermann Nachbur et al.

It is certified that error appears in the above identified patent and that said Letters Patent are hereby corrected as shown below:

Column 1, line 43, "1,5,5-aminotriazines" should read -- 1,3,5-aminotriazines --.

Signed and sealed this 6th day of January 1970.

(SEAL)
Attest:

Edward M. Fletcher, Jr.
Attesting Officer

WILLIAM E. SCHUYLER, JR.
Commissioner of Patents